(12) United States Patent
Howard et al.

(10) Patent No.: US 8,290,089 B2
(45) Date of Patent: Oct. 16, 2012

(54) DERIVATION AND FEEDBACK OF TRANSMIT STEERING MATRIX

(75) Inventors: Steven J. Howard, Ashland, MA (US); John W. Ketchum, Harvard, MA (US); Mark S. Wallace, Bedford, MA (US); J. Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 627 days.

(21) Appl. No.: 11/750,220

(22) Filed: May 17, 2007

(65) Prior Publication Data

US 2007/0268181 A1 Nov. 22, 2007

Related U.S. Application Data

(60) Provisional application No. 60/802,682, filed on May 22, 2006.

(51) Int. Cl.
*H03K 9/00* (2006.01)
*H04L 27/00* (2006.01)
(52) U.S. Cl. ........................................ 375/316
(58) Field of Classification Search .............. 375/220, 375/260, 267, 285, 299, 340, 346, 347, 316, 375/345, 350; 455/67.11, 101, 103, 500, 455/561
See application file for complete search history.

(56) References Cited

U.S. PATENT DOCUMENTS

| | | | |
|---|---|---|---|
| 5,581,583 A | 12/1996 | Conti et al. | |
| 5,668,837 A | 9/1997 | Dent | |
| 5,757,845 A | 5/1998 | Fukawa et al. | |
| 6,061,023 A * | 5/2000 | Daniel et al. | 342/354 |
| 6,144,711 A | 11/2000 | Raleigh et al. | |
| 6,175,743 B1 | 1/2001 | Alperovich et al. | |
| 6,198,775 B1 | 3/2001 | Khayrallah et al. | |
| 6,218,985 B1 | 4/2001 | Adams | |

(Continued)

FOREIGN PATENT DOCUMENTS

CA  2490520 A1  12/2003

(Continued)

OTHER PUBLICATIONS

International Search Report—PCT/US2007/069498, International Search Authority—European Patent Office—Feb. 14, 2008.

(Continued)

*Primary Examiner* — David C. Payne
*Assistant Examiner* — Syed Haider
(74) *Attorney, Agent, or Firm* — Qualcomm Patent Group; Dmitry Milikovsky; James H. Yancey, Jr.

(57) ABSTRACT

Techniques for efficiently deriving a transmit steering matrix and sending feedback for this matrix are described. A receiver determines a set of parameters defining a transmit steering matrix to be used for transmission from a transmitter to the receiver. The receiver may derive the transmit steering matrix based on a set of transformation matrices, which may be used for multiple iterations of Jacobi rotation to zero out off-diagonal elements of a channel matrix. The receiver may then determine the set of parameters based on the transformation matrices. The set of parameters may comprise at least one angle, at least one value, at least one index, etc., for each transformation matrix. The receiver sends the set of parameters defining the transmit steering matrix (instead of elements of the transmit steering matrix) to the transmitter for use by the transmitter to derive the transmit steering matrix.

20 Claims, 5 Drawing Sheets

U.S. PATENT DOCUMENTS

| | | | |
|---|---|---|---|
| 6,298,035 B1 | 10/2001 | Heiskala |
| 6,314,147 B1 | 11/2001 | Liang et al. |
| 6,351,499 B1 | 2/2002 | Paulraj et al. |
| 6,441,786 B1 | 8/2002 | Jasper et al. |
| 6,452,981 B1 | 9/2002 | Raleigh et al. |
| 6,473,467 B1 | 10/2002 | Wallace et al. |
| 6,477,161 B1 | 11/2002 | Hudson et al. |
| 6,486,828 B1 | 11/2002 | Cahn et al. |
| 6,496,535 B2 | 12/2002 | Xu |
| 6,542,556 B1 | 4/2003 | Kuchi et al. |
| 6,618,454 B1 | 9/2003 | Agrawal et al. |
| 6,642,888 B2 | 11/2003 | Kishigami et al. |
| 6,678,263 B1 | 1/2004 | Hammons, Jr. et al. |
| 6,711,124 B2 | 3/2004 | Khayrallah et al. |
| 6,711,528 B2 | 3/2004 | Dishman et al. |
| 6,760,388 B2 | 7/2004 | Ketchum et al. |
| 6,763,073 B2 | 7/2004 | Foschini et al. |
| 6,788,661 B1 | 9/2004 | Ylitalo et al. |
| 6,801,790 B2 | 10/2004 | Rudrapatna |
| 6,804,307 B1 | 10/2004 | Popovic |
| 6,810,506 B1 | 10/2004 | Levy |
| 6,816,555 B2 | 11/2004 | Sakoda |
| 6,842,487 B1 | 1/2005 | Larsson |
| 6,847,306 B2 | 1/2005 | Diba et al. |
| 6,859,747 B2 | 2/2005 | Yutkowitz |
| 6,862,271 B2 | 3/2005 | Medvedev et al. |
| 6,937,189 B2 | 8/2005 | Kim |
| 6,940,917 B2 | 9/2005 | Menon et al. |
| 6,956,897 B1 | 10/2005 | Honig |
| 6,975,668 B2 | 12/2005 | Zhang |
| 6,982,946 B2 | 1/2006 | Wiberg et al. |
| 6,999,472 B2 | 2/2006 | Hamalainen et al. |
| 7,020,110 B2 | 3/2006 | Walton et al. |
| 7,020,490 B2 | 3/2006 | Khatri |
| 7,031,669 B2 | 4/2006 | Vaidyanathan et al. |
| 7,057,555 B2 | 6/2006 | Lewis |
| 7,061,969 B2 | 6/2006 | Alamouti et al. |
| 7,065,144 B2 | 6/2006 | Walton et al. |
| 7,065,156 B1 | 6/2006 | Kuchi |
| 7,079,870 B2 | 7/2006 | Vaidyanathan |
| 7,092,737 B2 | 8/2006 | Horng et al. |
| 7,095,987 B2 | 8/2006 | Brothers, Jr. et al. |
| 7,099,678 B2 | 8/2006 | Vaidyanathan |
| 7,099,698 B2 | 8/2006 | Tarokh et al. |
| 7,110,350 B2 | 9/2006 | Li et al. |
| 7,110,378 B2 | 9/2006 | Onggosanusi et al. |
| 7,110,463 B2 | 9/2006 | Wallace et al. |
| 7,116,723 B2 | 10/2006 | Kim et al. |
| 7,130,580 B2 | 10/2006 | Alexiou et al. |
| 7,149,254 B2 | 12/2006 | Sampath |
| 7,151,806 B2 | 12/2006 | Hosoda et al. |
| 7,151,809 B2 | 12/2006 | Ketchum et al. |
| 7,190,734 B2 | 3/2007 | Giannakis et al. |
| 7,194,042 B2 | 3/2007 | Walton et al. |
| 7,200,631 B2 | 4/2007 | Mailaender et al. |
| 7,206,354 B2 | 4/2007 | Wallace et al. |
| 7,227,906 B2 | 6/2007 | Fukuda et al. |
| 7,236,478 B2 | 6/2007 | Wu et al. |
| 7,292,623 B2 | 11/2007 | Reznik |
| 7,298,805 B2 | 11/2007 | Walton et al. |
| 7,301,924 B1 | 11/2007 | Gurbuz et al. |
| 7,302,009 B2 | 11/2007 | Walton et al. |
| 7,317,750 B2 | 1/2008 | Shattil |
| 7,324,429 B2 | 1/2008 | Walton et al. |
| 7,324,482 B2 | 1/2008 | Hammons, Jr. et al. |
| 7,327,795 B2 | 2/2008 | Oprea |
| 7,327,798 B2 | 2/2008 | Won |
| 7,327,800 B2 | 2/2008 | Oprea et al. |
| 7,336,746 B2 | 2/2008 | Walton et al. |
| 7,356,073 B2 | 4/2008 | Heikkila |
| 7,359,466 B2 | 4/2008 | Huang et al. |
| 7,385,617 B2 | 6/2008 | Tahat |
| 7,394,754 B2 | 7/2008 | Li et al. |
| 7,436,896 B2 | 10/2008 | Hottinen et al. |
| 7,447,268 B2 | 11/2008 | Sadowsky et al. |
| 7,522,673 B2 | 4/2009 | Giannakis et al. |
| 7,529,177 B2 | 5/2009 | Celebi et al. |
| 7,539,253 B2 | 5/2009 | Li et al. |
| 7,555,053 B2 | 6/2009 | Trachewsky et al. |
| 7,583,747 B1 | 9/2009 | Damen et al. |
| 7,593,317 B2 | 9/2009 | Yuda et al. |
| 7,653,142 B2 | 1/2010 | Ketchum et al. |
| 7,711,762 B2 | 5/2010 | Howard et al. |
| 7,742,546 B2 | 6/2010 | Ketchum et al. |
| 7,764,754 B2 | 7/2010 | Walton et al. |
| 7,787,554 B1* | 8/2010 | Nabar et al. ............... 375/267 |
| 7,894,548 B2 | 2/2011 | Walton et al. |
| 7,895,254 B2 | 2/2011 | Ketchum et al. |
| 7,899,131 B2 | 3/2011 | Walton et al. |
| 7,978,649 B2 | 7/2011 | Howard et al. |
| 7,978,778 B2 | 7/2011 | Wallace et al. |
| 7,991,065 B2 | 8/2011 | Wallace et al. |
| 2001/0053124 A1 | 12/2001 | Ichihara et al. |
| 2002/0009125 A1 | 1/2002 | Shi |
| 2002/0102940 A1 | 8/2002 | Bohnke et al. |
| 2002/0172269 A1 | 11/2002 | Xu |
| 2002/0193146 A1 | 12/2002 | Wallace et al. |
| 2002/0196742 A1 | 12/2002 | Baker et al. |
| 2003/0011274 A1 | 1/2003 | Saint-Michel et al. |
| 2003/0026349 A1* | 2/2003 | Onggosanusi et al. ....... 375/267 |
| 2003/0072254 A1 | 4/2003 | Ma et al. |
| 2003/0112745 A1 | 6/2003 | Zhuang et al. |
| 2003/0123567 A1 | 7/2003 | Shigemasa et al. |
| 2003/0181211 A1 | 9/2003 | Razavilar et al. |
| 2003/0186698 A1 | 10/2003 | Holma et al. |
| 2003/0189999 A1 | 10/2003 | Kadous |
| 2003/0228850 A1 | 12/2003 | Hwang |
| 2003/0235147 A1 | 12/2003 | Walton et al. |
| 2003/0235238 A1 | 12/2003 | Schelm et al. |
| 2003/0235255 A1* | 12/2003 | Ketchum et al. ............. 375/285 |
| 2004/0002364 A1 | 1/2004 | Trikkonen et al. |
| 2004/0052315 A1 | 3/2004 | Thielecke et al. |
| 2004/0081263 A1 | 4/2004 | Lee et al. |
| 2004/0082356 A1 | 4/2004 | Walton et al. |
| 2004/0085939 A1 | 5/2004 | Wallace et al. |
| 2004/0136349 A1 | 7/2004 | Walton et al. |
| 2004/0165675 A1 | 8/2004 | Ito et al. |
| 2004/0190639 A1* | 9/2004 | Pauli et al. ................ 375/260 |
| 2004/0203473 A1* | 10/2004 | Liu ........................ 455/69 |
| 2005/0017511 A1 | 1/2005 | Dalton |
| 2005/0026570 A1 | 2/2005 | Han |
| 2005/0149320 A1 | 7/2005 | Kajala et al. |
| 2005/0175115 A1 | 8/2005 | Walton et al. |
| 2005/0180312 A1 | 8/2005 | Walton et al. |
| 2005/0195733 A1 | 9/2005 | Walton et al. |
| 2005/0238111 A1 | 10/2005 | Wallace et al. |
| 2005/0249159 A1 | 11/2005 | Abraham et al. |
| 2005/0249174 A1 | 11/2005 | Lundby et al. |
| 2005/0265275 A1 | 12/2005 | Howard et al. |
| 2005/0267925 A1 | 12/2005 | Clue |
| 2005/0276347 A1 | 12/2005 | Mujtaba et al. |
| 2006/0013250 A1 | 1/2006 | Howard et al. |
| 2006/0050770 A1 | 3/2006 | Wallace et al. |
| 2006/0067277 A1 | 3/2006 | Thomas et al. |
| 2006/0067421 A1 | 3/2006 | Walton et al. |
| 2006/0068718 A1* | 3/2006 | Li et al. .................. 455/69 |
| 2006/0106902 A1 | 5/2006 | Howard et al. |
| 2006/0155798 A1 | 7/2006 | Ketchum et al. |
| 2006/0234789 A1 | 10/2006 | Tarokh et al. |
| 2006/0274844 A1 | 12/2006 | Walton et al. |
| 2006/0285531 A1 | 12/2006 | Howard et al. |
| 2007/0009059 A1 | 1/2007 | Wallace et al. |
| 2007/0217538 A1* | 9/2007 | Waxman ................. 375/267 |
| 2007/0249296 A1 | 10/2007 | Howard et al. |
| 2008/0031372 A1 | 2/2008 | Walton et al. |
| 2008/0031374 A1 | 2/2008 | Walton et al. |
| 2008/0095282 A1 | 4/2008 | Walton et al. |
| 2008/0273617 A1 | 11/2008 | Lundby et al. |
| 2009/0290657 A1 | 11/2009 | Howard et al. |
| 2010/0074301 A1 | 3/2010 | Howard et al. |
| 2010/0169396 A1 | 7/2010 | Howard et al. |
| 2011/0142097 A1 | 6/2011 | Walton et al. |

FOREIGN PATENT DOCUMENTS

| | | |
|---|---|---|
| CA | 1476695 A | 2/2004 |
| CA | 2510840 A1 | 7/2004 |
| CN | 1592144 A | 3/2005 |

| | | | |
|---|---|---|---|
| EP | 0091999 A1 | 10/1983 |
| EP | 0752793 A2 | 1/1997 |
| EP | 0905920 A2 | 3/1999 |
| EP | 1009124 A2 | 6/2000 |
| EP | 1073214 A1 | 1/2001 |
| EP | 1185001 | 3/2002 |
| EP | 1220506 A1 | 7/2002 |
| EP | 1223702 A1 | 7/2002 |
| EP | 1241824 | 9/2002 |
| EP | 1353452 A2 | 10/2003 |
| EP | 1361686 | 11/2003 |
| EP | 1396956 A1 | 3/2004 |
| JP | 11205026 A | 7/1999 |
| JP | 2001237751 A | 8/2001 |
| JP | 2002503048 T | 1/2002 |
| JP | 2002524972 | 8/2002 |
| JP | 2003530010 | 10/2003 |
| JP | 20044023416 A | 1/2004 |
| JP | 2004064654 A | 2/2004 |
| JP | 2004072150 A | 3/2004 |
| JP | 2004096753 A | 3/2004 |
| JP | 2004104790 A | 4/2004 |
| JP | 2005524331 T | 8/2005 |
| JP | 2007515131 | 6/2007 |
| JP | 2007515829 T | 6/2007 |
| JP | 2007523549 T | 8/2007 |
| JP | 2007523550 T | 8/2007 |
| JP | 2007527150 | 9/2007 |
| JP | 2007529972 T | 10/2007 |
| JP | 2007538414 T | 12/2007 |
| KR | 200260860 | 7/2002 |
| KR | 20040061023 A | 7/2004 |
| KR | 20040089748 | 10/2004 |
| KR | 20060123496 | 12/2006 |
| RU | 2111619 | 5/1998 |
| RU | 2116698 C1 | 7/1998 |
| RU | 2202152 | 4/2003 |
| RU | 2238611 C1 | 10/2004 |
| RU | 2292116 | 4/2005 |
| RU | 2005115862 | 1/2006 |
| TW | 508960 | 11/2002 |
| TW | 510103 B | 11/2002 |
| TW | 512602 | 12/2002 |
| TW | 200304287 | 9/2003 |
| TW | 1337487 | 2/2011 |
| VU | WO2005099211 A1 | 10/2005 |
| WO | WO9737456 A2 | 10/1997 |
| WO | WO0156218 A1 | 2/2001 |
| WO | WO0176110 A2 | 10/2001 |
| WO | WO02005506 | 1/2002 |
| WO | WO0225857 A1 | 3/2002 |
| WO | WO02078211 A2 | 10/2002 |
| WO | WO02093784 A1 | 11/2002 |
| WO | WO03015334 | 2/2003 |
| WO | WO03041300 | 5/2003 |
| WO | WO03050968 | 6/2003 |
| WO | WO03056742 A1 | 7/2003 |
| WO | WO03058871 A1 | 7/2003 |
| WO | WO03063526 A1 | 7/2003 |
| WO | WO03071711 | 8/2003 |
| WO | WO03073646 | 9/2003 |
| WO | WO03094386 A1 | 11/2003 |
| WO | WO03101029 A1 | 12/2003 |
| WO | WO04002047 | 12/2003 |
| WO | WO040022011 | 12/2003 |
| WO | WO2004021605 A1 | 3/2004 |
| WO | WO2004038984 A2 | 5/2004 |
| WO | WO2004038985 A2 | 5/2004 |
| WO | WO2004038987 | 5/2004 |
| WO | WO2004039011 | 5/2004 |
| WO | WO2004043082 A2 | 5/2004 |
| WO | 2004054191 | 6/2004 |
| WO | 2005060144 | 6/2005 |
| WO | WO2005060192 A1 | 6/2005 |
| WO | WO200508882 A1 | 9/2005 |
| WO | WO2005114868 | 12/2005 |
| WO | WO2006053340 A2 | 5/2006 |

OTHER PUBLICATIONS

Agustin A et al: "LDC Construction with a Defined Structure [MIMO Linear Dispersive Codes]" Vehicular Technology Confernece, 2003. VTC 2003-Fall. 2003 IEEE 58TH Orlando, FL, USA Oct. 6-9, 2003, Piscataway NJ, USA, IEEE, US, Oct. 6, 2003, pp. 433-437 vol. 11.

Alamouti, S.M., "A Simple Transmit Diversity Technique for Wireless Communications," IEEE Journal on Select Areas in Communications, vol. 16, No. 8, Oct. 1998, pp. 1451-1458.

Antenna-Theory.com, "Steering Vector", http://www.antennatheory.com, pp. 1., No date given. (USPTO Examiner in U.S. Appl. No. 10/821,390 on Jan. 11, 2011), Dated Feb. 2, 2009.

Auer, G., "Channel Estimation for OFDM With Cyclic Delay Diversity," Personal, Indoor and Mobile Radio Communications, 2004. PIMRC 2004 15TH IEEE International Symposium on September 5, 2004, vol. 3, pp. 1792-1796.

Bauch, et al,, "Orthogonal Frequency Division Multiple Access with Cyclic Delay Diversity, " ITG Worshop on Smart Antennas, Munich Germany, Mar. 18-19, 2004, pp. 17-24.

Bello: "Characterization of Randomly Time-Variante Linear Channels," Communications Systems, IEEE transactions on, vol. 11, Issue 4, pp. 360-393, Dec. 1963.

Bem et al,, "Smart Antennas for Mobile Communications Systems," International Conference on Microwaves, Radar and Wireless Communications, vol. 3, May 22, 2000, pp. 120-130, XP010537679.

Bourdoux et al., "Non-reciprocal transceivers in OFDM/SDMA Systems: Impact and Mitigation," Radio and Wireless Conference, Aug. 10, 2003, pp. 183-186, XP010656728.

Bruhl et al., "Investigation of Front-end Requirements for MIMO-Systems Using Downlink Pre-Distortion," European Personal Mobile Communications Conference, 2003, pp. 472-476, XP002330243.

Crow, "The Fourier Matrix", Apr. 27, 2001, http://www.maths.abdn.ac.uk/-igcltch/mx4002/notes/node91.html, pp. 1-3.

Dammann et al., "Beamforming in Combination with Space-Time Diversity for Broadband OFDM Systems", ICC 2002. 2002 IEEE International Conference on Communications. Conference Proceeding. April 28-May,2 2002, IEEE International Conference on Communications, pp. 165-171, XP010589479.

Doonstnejad et al, "Space-time Spreading Codes for a Multiuser MIMO System", Institute of Electrical and Electronics Engineers, Conference Record of the 36th. Asilomar Conference on Signals, Systems, & Computers, Pacific Grove, California, Nov. 3-6, 2002, pp. 1374-1378, XP10638423.

Farrokhi et al. , "Link-Optimal Space-Time Processing with Multiple Transmit and Receive Antennas, " IEEE Communications Letters, vol. 5, No. 3, pp. 85-87(Mar. 2001).

Giacomantone, Javier Oscar, "Tradeoffs in Arithmetic Architectures for CORDIC Algorithm Design.", pp. 1-9, CeTAD-Fac. De Ingenieria-UNLP, Argentina [presented at IBERCHIP VII Workshop, Session 4, Montevideo, Uruguay, Mar. 21-23, 2001].

Goldsmith, Andrea et al., "Capacity Limites of MIMO Channels," IEEE Journal on Selected Areas in Communications, vol. 21, No. 5, pp. 684-702, Jun. 2003.

Gotze, J., et al., "An Algorithm and Architecture Based on Orthonormal Mu-Rotations for computing the Symmetric EVD" Integration, The VLSI Journal, North-Holland Publishing Company. Amsterdam, NL, vol. 20, No. 1, Dec. 1, 1995, pp. 21-39.

Griffin, Grant R., "Cordic FAQ," lowegian's dspGuru. pp. 1-6.

Hanzo et al., Single and Multi-Carrier Ds-CDMA, "Space-Time Spreading Aided Single-Carrier Wideband CDMA Communicating Over Multipath Nakagami Fading Channnels, " Chapter 8, pp. 279-310, John Wiley & Sons, England, 2003 (XP-002357231).

Hemkumar N. D., et al "Efficient Complex Matrix Transformations with CORDIC" Computer Arithmetic, 1994. Proceedings., 11th Symposium on Windsor, Ont., Canada Jun. 29-Jul. 2, 1993, Los Alamitos, CA, USA, IEEE Comput. Soc, (Jun. 29, 1993.), pp. 122-129.

Hochwald et al., "A Transmitter Diversity Scheme for Wideband CDMA Systems based on Space-time Spreading", Selected Areas in Communications, vol. 19, No. Jan. 2001.

Hochwald, et al., "Systematic Design of Unitary Space-Time Constellations," IEEE Transactons on Information Theory, 2000, 46 (6), 1962-1973.

Hochwald et al., "Unitary Space-Time Modulation for Multiple-Antenna Communications in Rayleigh Flat Fading," IEEE Transactions on Information Theory, vol. 46, No. 2, pp. 543-564 (2000).

Hsiao, S. et al.: "Parallel Singular Value Decomposition of Complex Matrices Using Multidimensional CORDIC Algorithms" IEEE Transactions of Signal Processing, IEEE Service Center, New York, NY, UA, vol. 44, No. 3, pp. 685-697, Mar. 1, 1996.

IEEE Std 802.11a-1999 (Supplement to IEEE Std 801.11-1999) "Part 11: Wireless LAN Medium Access Control (MAC) and Physical Layer (PHY) specifications: High-Speed Physical Layer in the 5GHZ Band", pp. 1-90, Sep. 1999.

IEEE Std. 802.11g IEEE Standard for Information technology-Telecommunications and information exchange between systems—Local and metropolitan area networks—Specific requirements—Part 11: Wireless LAN Medium Access Control (MAC) and Physical Layer (PHY) Specifications, Amendment 4: Further Higher Data Rate Extension in the 2.4 GHz Band, LAN/MAN Standards Committee IEEE Computer Society Jun. 27, 2003, pp. i-x & 1-67.

Jihoon Choi et al., "Interpolation Based Transmit Beamforming for MIMO-OFDM with Limited Feedback", IEEE Communications Society, 2004, 249-253, Austin Texas.

Jungnickel et al., "A Mimo System with Reciprocal Transceivers for the Time-division Duplex Mode," Antennas and Propagation Society International Symposium, vol.2, Jun. 20, 2004, pp. 1267-1270, XP010721570.

Kaiser, "Spatial Transmit Diversity Techniques for Broadband OFDM Systems," IEEE Global Telecommunications Conference, 2000. GLOBRCOMM '00. San Francisco, CA, Nov. 27-Dec. 1, 2000, vol. 3, pp. 1824-1828, XP001195742.

Ketchum, John, et al., "PHY Design for Spatial Multiplexing MIMO WLAN," IEEE 802.11-04/0721r0, IEEE, Jul. 2004, pp. 1-33 (Spatial Spreading Mode, Intrinsic Transmission Mode).

Kim, M. et al.: "Design of Jacobi EVD Processor Based on CORDIC for DOA Estimation with Music Algorithm." Personal, Indoor, and Mobile Radio Communications, 2002. pp. 120-124, The 13th IEEE International Symposium on Sep. 15-18, 2002, Piscataway, NJ, USA, IEEE.

Laroia R et al., "Enhanced Opportunistic Beamforming," Vehicular Technology Conference, 2003. VTC 2003-Fall. IEEE 58th Orlando, FL, USA Oct. 6-9, 2003, pp. 1762-1766, XP010702878.

Li, et al., "Transmit Diversity Over Quasi-Static Fading Channels Using Multiple Antennas and Random Signal Mapping," IEEE Transactions On Communicatons, vol. 51, No. 11, Nov. 2003, pp. 1918-1926.

Liu et al., "OFDM-MIMO WLAN AP Front-end Gain and Phase Mismatch Calibration," XP002330244.

Liu, Jung-Tao: "Successive decoding of multiple space time coded streams in multi-input multi-output systems," Global Telecommunications Conference, 2002. Globecom '02. IEEE, USA, Nov. 21, 2002, 1007-1011 vol. 1.

Medles et al., "Multistream Space-Time Coding by Spatial Spreading, Scrambling and Delay Diversity," IEEE International Conference on Acoustics, Speech and Signal Processing, vol. 4 of 4, XP-10803892, pp. 2429-2432 (2002).

Michalke C et al: "Efficient tracking of eigenspaces and its application to eigenbeanforming" Personal, Indoor and Mobile Radio Communications 14th IEEE Proceedings, Sep. 7, 2003, pp. 2847-2851, Sections II.B and III.C XP010678152.

Narula, et al., "Performance Limits of Coded Diversity Methods for Transmitter Antenna Arrays, " IEEE Transactins on Information Theory, Vol. 45, No. 7, Nov. 1999, pp. 2418-2433.

Nowak, et al., "An Efficient Implementation of a 256-point FFT Processor with CORDIC for OFDM Systems," Delft University of Technology, Faculty of Information Technology and Systems Circuits and Systems Group, pp. 427-434, ISBN: 90-73461-15-4. 1998. STW, 1998 1026-01.

Oksa G et al: "Multi-level parallelism in the block-jacobi SVD algorithm" Parallel and.Distribution Processing, 2001. Proceedings. Ninth Euromicr O Workshop. IEEE, Feb. 7, 2001, pp. 306-313, XP010532138, ISBN: 978-0/7695-0987-7.

Pan, et al., "Dynamic Sub-channel Allocation with Adaptive Beamforminq for Broadband OFDM Wireless Systems," IEEE Global Telecommunications Conference, 2002. GLOBECOMM '02. Taipei, Taiwan, Nov. 17-21, 2002, New York, NY, Nov. 17, 2002, vol. 1, pp. 711-715.

Ralf Seeger et al: "Advance Eigenbearaforming for the 3GPP UMTS FDD Downlink" ITG IEEE Workshop on Smart Antennas, XX, XX, Apr. 4, 2004, pp. 1-8, XP002468805, Section III.

Schafer F, et al.: "Efficient Tracking of Eigenspaces and its application to MIMO systems" Proceedings of the IST Mobile and Wireless Communications Summit, Jun. 18, 2003, pp. 1-6, XP002478514.

Sharif et al., "On the Capacity of MIMO Broadcast Channel with Partial Side.Information", Department of Electrical Engineering, CA Institute of Engineering, IEEE 2002, pp. 958-962.

Suthaharan, et al., Space-time coded MIMO-OFDM for high capacity and high data-rate wireless communication over frequency selective fading channels, Mobile and Wireless Communications Networks, 2002. 4th International Workshop on, USA, Sep. 11, 2002, 424-428.

Taiwan Search Report—TW094130237—TIPO-Oct. 3, 2011.

T.L. Marietta, B. Hassibi, B.M Hochwald, "Structured Unitary Space-Time Autocoding Constellations," IEEE Trans. ON IT,vol. 48, No. 4, April 2002.

Winters, J. "Smart antennas for wireless systems ", IEEE Personal Communications, Dec. 5, 2003, pp. 1-113.

Written Opinion - PCT/US2007/069498, International Search Authority, European Patent Office, Feb. 14, 2008.

Yao, Huan, "Efficient Signal, Code, and Receiver Designs for MIMO Communication Systems, " PH.D. Thesis, Massachusetts Institute of Technology, Cambridge, Massachusetts, 2003.

Yu and Cioffi, "Trellis Precoding for the Broadcast Channel," IEEE Global Telecommunications Conference, Vol. 2, Electrical Engineering Department, Stanford, University, Stanford, California (2001), pp. 1344-1348.

Branka et al., "Performance Limits of Multiple-Input Multiple-Output Wireless Communication Systems", Space-Time Coding, John Wiley& Sons. Ltd, Apr., 2003, England, pp. 1-9.

Taiwan Search Report—TW093139437—TIPO—Jan. 24, 2012.

* cited by examiner

DERIVATION AND FEEDBACK OF TRANSMIT STEERING MATRIX

The present application claims priority to provisional U.S. Application Ser. No. 60/802,682, entitled "JACOBI ITERATIONS FOR EIGENVECTOR DECOMPOSITION AND FEEDBACK REDUCTION," filed May 22, 2006, assigned to the assignee hereof and incorporated herein by reference.

BACKGROUND

I. Field

The present disclosure relates generally to communication, and more specifically to techniques for sending feedback for a multiple-input multiple-output (MIMO) transmission.

II. Background

In a wireless communication system, a transmitter may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit up to T data streams simultaneously from the T transmit antennas to improve throughput. Alternatively, the transmitter may transmit a single data stream from all T transmit antennas to improve reception by the receiver.

Good performance (e.g., high throughput) may be achieved by transmitting data on eigenmodes of the MIMO channel. The eigenmodes may be viewed as orthogonal spatial channels. The receiver may estimate the MIMO channel response, derive a transmit steering matrix based on a MIMO channel response matrix, and send the transmit steering matrix to the transmitter. The transmitter may then perform spatial processing with the transmit steering matrix to send data on the eigenmodes.

Valuable radio resources are used to send the transmit steering matrix from the receiver to the transmitter. There is therefore a need in the art for techniques to efficiently send the transmit steering matrix so that overhead may be reduced.

SUMMARY

Techniques for efficiently deriving a transmit steering matrix and sending feedback for this matrix are described herein. In one design, a receiver may determine a set of parameters defining a transmit steering matrix to be used for transmission from a transmitter to the receiver. The receiver may derive the transmit steering matrix based on a plurality of transformation matrices, which may be used for multiple iterations of Jacobi rotation to zero out off-diagonal elements of a channel matrix. The receiver may determine the set of parameters based on the transformation matrices. The set of parameters may comprise at least one angle, at least one value, at least one index, etc., for each transformation matrix. The receiver may send the set of parameters defining the transmit steering matrix (instead of elements of the transmit steering matrix) to the transmitter for use by the transmitter to derive the transmit steering matrix.

Various aspects and features of the disclosure are described in further detail below.

DETAILED DESCRIPTION

The techniques described herein may be used for various wireless communication networks such as wireless wide area networks (WWANs), wireless metropolitan area networks (WMANs), wireless local area networks (WLANs), etc. The terms "network" and "system" are often used interchangeably. The techniques may also be used for various multiple access schemes such as Frequency Division Multiple Access (FDMA), Code Division Multiple Access (CDMA), Time Division Multiple Access (TDMA), Spatial Division Multiple Access (SDMA), Orthogonal FDMA (OFDMA), Single-Carrier FDMA (SC-FDMA), etc. An OFDMA system utilizes Orthogonal Frequency Division Multiplexing (OFDM). An SC-FDMA system utilizes Single-Carrier Frequency Division Multiplexing (SC-FDM). OFDM and SC-FDM partition the system bandwidth into multiple (K) orthogonal subcarriers, which are also referred to as tones, bins, etc. Each subcarrier may be modulated with data. In general, modulation symbols are sent in the frequency domain with OFDM and in the time domain with SC-FDM. An OFDMA system may implement a radio technology such as Long Term Evolution (LTE), Ultra Mobile Broadband (UMB), IEEE 802.20, IEEE 802.16 (which is also referred to as WiMAX), IEEE 802.11 (which is also referred to as Wi-Fi), Flash-OFDM®, etc. These various radio technologies and standards are known in the art.

Figure 1:
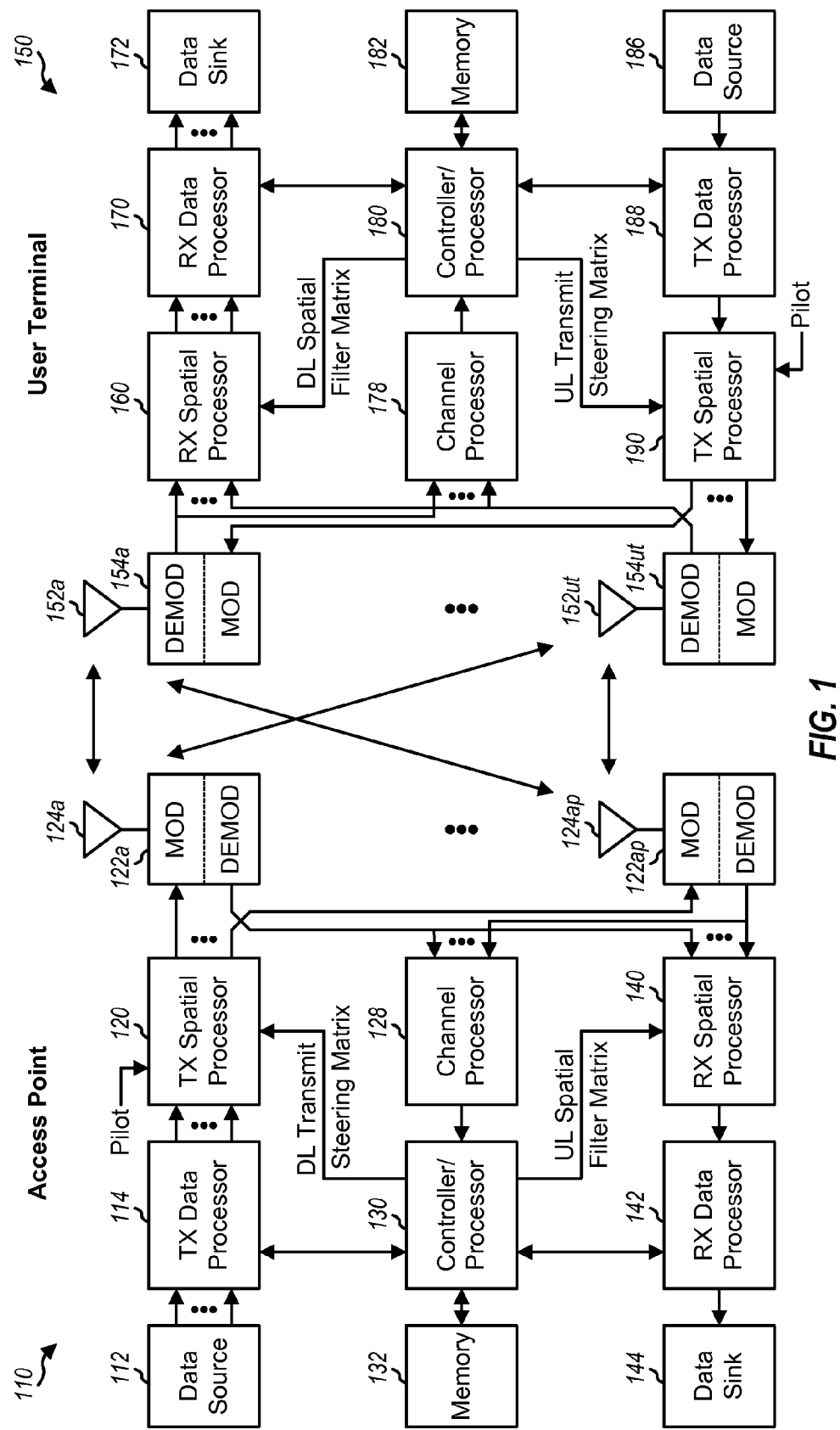
FIG. 1 shows a block diagram of an access point and a terminal.

FIG. 1 shows a block diagram of a design of an access point 110 and a terminal 150 in a wireless communication network. An access point is a station that communicates with the terminals. An access point may also be called, and may contain some or all of the functionality of, a base station, a Node B, an evolved Node B (eNode B), etc. A terminal may also be called, and may contain some or all of the functionality of, a mobile station, a user equipment, an access terminal, an user terminal, a subscriber station, a station, etc. Terminal 150 may be a cellular phone, a personal digital assistant (PDA), a wireless communication device, a handheld device, a wireless modem, a laptop computer, a cordless phone, etc. Access point 110 is equipped with multiple ($N_{ap}$) antennas that may be used for data transmission and reception. Terminal 150 is equipped with multiple ($N_{ut}$) antennas that may be used for data transmission and reception.

On the downlink, at access point 110, a transmit (TX) data processor 114 may receive traffic data from a data source 112 and/or other data from a controller/processor 130. TX data processor 114 may process (e.g., format, encode, interleave, and symbol map) the received data and generate data symbols, which are modulation symbols for data. A TX spatial processor 120 may multiplex the data symbols with pilot symbols, perform transmitter spatial processing with one or more downlink (DL) transmit steering matrices, and provide $N_{ap}$ streams of output symbols to $N_{ap}$ modulators (MOD) 122a through 122ap. Each modulator 122 may process its output symbol stream (e.g., for OFDM, SC-FDM, CDMA, etc.) to generate an output chip stream. Each modulator 122 may further condition (e.g., convert to analog, amplify, filter, and upconvert) its output chip stream to generate a downlink signal. $N_{ap}$ downlink signals from modulators 122a through 122ap may be transmitted from antennas 124a through 124ap, respectively.

At terminal 150, $N_{ut}$ antennas 152a through 152ut may receive the downlink signals from access point 110, and each antenna 152 may provide a received signal to a respective demodulator (DEMOD) 154. Each demodulator 154 may perform processing complementary to the processing performed by modulators 122 and provide received symbols. A receive (RX) spatial processor 160 may perform spatial matched filtering on the received symbols from all demodulators 154a through 154ut and provide data symbol estimates, which are estimates of the data symbols transmitted by access point 110. An RX data processor 170 may further process (e.g., symbol demap, deinterleave, and decode) the data symbol estimates and provide decoded data to a data sink 172 and/or a controller/processor 180.

A channel processor 178 may process pilot symbols received on the downlink from access point 110 and may estimate the downlink MIMO channel response. Processor 178 may decompose a downlink channel response matrix for each subcarrier of interest, as described below, to obtain a DL transmit steering matrix and eigenvalues for that subcarrier. Processor 178 may also derive a DL spatial filter matrix for each subcarrier of interest based on the transmit steering matrix and eigenvalues for that subcarrier. Processor 178 may provide the DL spatial filter matrices to RX spatial processor 160 for downlink spatial matched filtering and may provide the DL transmit steering matrices to controller/processor 180 for feedback to access point 110.

The processing for the uplink may be the same as or different from the processing for the downlink. Traffic data from a data source 186 and/or other data from controller/processor 180 may be processed (e.g., encoded, interleaved, and modulated) by a TX data processor 188, and multiplexed with pilot symbols and spatially processed by TX spatial processor 190 with one or more uplink (UL) transmit steering matrices. The output symbols from TX spatial processor 190 may be further processed by modulators 154a through 154ut to generate $N_{ut}$ uplink signals, which may be transmitted via antennas 152a through 152ut.

At access point 110, the uplink signals from terminal 150 may be received by antennas 124a through 124ap and processed by demodulators 122a through 122ap to obtain received symbols. An RX spatial processor 140 may perform spatial matched filtering on the received symbols and provide data symbol estimates. An RX data processor 142 may further process the data symbol estimates and provide decoded data to a data sink 144 and/or controller/processor 130.

A channel processor 128 may process pilot symbols received on the uplink from terminal 150 and may estimate the uplink MIMO channel response. Processor 128 may decompose an uplink channel response matrix for each subcarrier of interest to obtain an UL transmit steering matrix and eigenvalues for that subcarrier. Processor 128 may also derive an UL spatial filter matrix for each subcarrier of interest. Processor 128 may provide the UL spatial filter matrices to RX spatial processor 140 for uplink spatial matched filtering and may provide the UL transmit steering matrices to controller/processor 130 for feedback to terminal 150.

Controllers/processors 130 and 180 may control the operation at access point 110 and terminal 150, respectively. Memories 132 and 182 may store data and program codes for access point 110 and terminal 150, respectively.

The techniques described herein may be used for MIMO transmission on the downlink as well as the uplink. The techniques may be performed by terminal 150 to derive transmit steering matrices for the downlink and to send these matrices to access point 110 for MIMO transmission on the downlink. The techniques may also be performed by access point 110 to derive transmit steering matrices for the uplink and to send these matrices to terminal 150 for MIMO transmission on the uplink.

A MIMO channel formed by multiple (T) transmit antennas at a transmitter and multiple (R) receive antennas at a receiver may be characterized by an R×T channel response matrix H, which may be given as:

$$\underline{H} = \begin{bmatrix} h_{1,1} & h_{1,2} & \cdots & h_{1,T} \\ h_{2,1} & h_{2,2} & \cdots & h_{2,T} \\ \vdots & \vdots & \ddots & \vdots \\ h_{R,1} & h_{R,2} & \cdots & h_{R,T} \end{bmatrix}, \quad \text{Eq (1)}$$

where entry $h_{i,j}$, for i=1, . . . R and j=1, . . . T, denotes the coupling or complex channel gain between transmit antenna j and receive antenna i. For downlink transmission, access point 110 is the transmitter, terminal 150 is the receiver, $T=N_{ap}$ and $R=N_{ut}$. For uplink transmission, terminal 150 is the transmitter, access point 110 is the receiver, $T=N_{ut}$ and $R=N_{ap}$.

The channel response matrix H may be diagonalized to obtain multiple (S) eigenmodes of H, where $S \leq \min\{T, R\}$. The diagonalization may be achieved by performing eigenvalue decomposition of a correlation matrix of H.

The eigenvalue decomposition may be expressed as:

$$\underline{R} = \underline{H}^H \underline{H} = \underline{V} \underline{\Lambda} \underline{V}^H \quad \text{Eq (2)}$$

where

R is a T×T correlation matrix of H,
V is a T×T unitary matrix whose columns are eigenvectors of R,
Λ is a T×T diagonal matrix of eigenvalues of R, and
"$^H$" denotes a conjugate transpose.

Unitary matrix V is characterized by the property $\underline{V}^H \underline{V} = \underline{I}$, where I is the identity matrix. The columns of a unitary matrix are orthogonal to one another, and each column has unit power. Diagonal matrix Λ contains possible non-zero values along the diagonal and zeros elsewhere. The diagonal elements of Λ are eigenvalues of R. These eigenvalues represent the power gains of the S eigenmodes. R is a Hermitian matrix whose off-diagonal elements have the following property: $r_{i,j} = r_{j,i}^*$, where "*" denotes a complex conjugate.

The transmitter may perform transmitter spatial processing based on the eigenvectors in V to transmit data on the eigenmodes of H, as follows:

$$\underline{x} = \underline{V}\underline{s}, \quad \text{Eq (3)}$$

where s is a T×1 vector with S data symbols to be sent on S eigenmodes, and x is a T×1 vector with T output symbols to be sent from the T transmit antennas.

The spatial processing in equation (3) may also be referred to as beamforming, precoding, etc. The transmitter may also perform beamsteering by (i) scaling each element of V to obtain a matrix $\tilde{V}$ with unit-magnitude elements and (ii) performing transmitter spatial processing with $\tilde{V}$ instead of V. In any case, beamforming and beamsteering may provide better performance than simply transmitting data from the T transmit antennas without any spatial processing.

The receiver may obtain received symbols from the R receive antennas, which may be expressed as:

$$r = Hx + n, \quad \text{Eq (4)}$$

where r is an R×1 vector with R received symbols from the R receive antennas, and
n is an R×1 noise vector.

The receiver may perform spatial matched filtering on the received symbols, as follows:

$$\hat{s} = \Lambda^{-1} V^H H^H r, \quad \text{Eq (5)}$$

where ŝ is a T×1 vector of data symbol estimates, which are estimates of the data symbols in s. The receiver may also perform receiver spatial processing in other manners.

As shown in equation (3), matrix V may be used by the transmitter for spatial processing for data transmission. As shown in equation (5), matrix V may also be used by the receiver for spatial processing for data reception. V may be derived by performing eigenvalue decomposition of R or singular value decomposition of H.

Eigenvalue decomposition of T×T complex Hermitian matrix R may be performed with an iterative process that uses Jacobi rotation repeatedly to zero out off-diagonal elements in R. Jacobi rotation is also commonly referred to as Jacobi method, Jacobi transformation, etc. For a 2×2 complex Hermitian matrix, one iteration of the Jacobi rotation is sufficient to obtain two eigenvectors and two eigenvalues for this matrix. For a larger complex Hermitian matrix with dimension greater than 2×2, the iterative process performs multiple iterations of the Jacobi rotation to obtain the eigenvectors and eigenvalues for the larger complex matrix.

In the following description, index i denotes iteration number and is initialized as i=0. R is a T×T Hermitian matrix to be decomposed, where T>2. A T×T matrix $D_i$ is an approximation of diagonal matrix Λ of eigenvalues of R and may be initialized as $D_0 = R$. A T×T matrix $V_i$ is an approximation of matrix V of eigenvectors of R and may be initialized as $V_0 = I$.

A single iteration of the Jacobi rotation to update matrices $D_i$ and $V_i$ may be performed as follows. First, a 2×2 Hermitian matrix $D_{pq}$ may be formed based on the current $D_i$, as follows:

$$\underline{D}_{pq} = \begin{bmatrix} d_{pp} & d_{pq} \\ d_{qp} & d_{qq} \end{bmatrix}, \text{ for } 1 \le p < T \text{ and } p < q \le T, \quad \text{Eq (6)}$$

where $d_{pq}$ is the element at location (p,q) in $D_i$.

$D_{pq}$ is a 2×2 submatrix of $D_i$. The four elements of $D_{pq}$ are four elements at locations (p,p), (p,q), (q,p) and (q,q) in $D_i$. Indices p and q may be selected as described below.

Eigenvalue decomposition of $D_{pq}$ may be performed to obtain a 2×2 unitary matrix $V_{pq}$ of eigenvectors of $D_{pq}$. The elements of $V_{pq}$ may be computed directly from the elements of $D_{pq}$, as follows:

$$d = \sqrt{(\mathrm{Re}\{d_{pq}\})^2 + (\mathrm{Im}\{d_{pq}\})^2}, \quad \text{Eq (7a)}$$

$$c_1 = \frac{\mathrm{Re}\{d_{pq}\}}{d} = \cos(\angle d_{pq}), \quad \text{Eq (7b)}$$

$$s_1 = \frac{\mathrm{Im}\{d_{pq}\}}{d} = \sin(\angle d_{pq}), \quad \text{Eq (7c)}$$

$$g_1 = c_1 - j s_1, \quad \text{Eq (7d)}$$

$$\tau = \frac{d_{qq} - d_{pp}}{2 \cdot d}, \quad \text{Eq (7e)}$$

$$x = \sqrt{1 + \tau^2}, \quad \text{Eq (7f)}$$

$$t = \frac{1}{|\tau| + x}, \quad \text{Eq (7g)}$$

$$c = \frac{1}{\sqrt{1 + t^2}}, \quad \text{Eq (7h)}$$

$$s = t \cdot c = \sqrt{1 - c^2}, \quad \text{Eq (7i)}$$

$$\text{then } \underline{V}_{pq} = \begin{bmatrix} v_{pp} & v_{pq} \\ v_{qp} & v_{qq} \end{bmatrix} = \begin{bmatrix} c & -s \\ g_1 \cdot s & -g_1 \cdot c \end{bmatrix}, \quad \text{Eq (7j)}$$

$$\text{else } \underline{V}_{pq} = \begin{bmatrix} v_{pp} & v_{pq} \\ v_{qp} & v_{qq} \end{bmatrix} = \begin{bmatrix} s & c \\ g_1 \cdot c & -g_1 \cdot s \end{bmatrix}, \quad \text{Eq (7k)}$$

where d is the magnitude of $d_{pq}$, $\angle d_{pq}$ is the phase of $d_{pq}$, $g_1$ is a complex value, and c and s are real values with unit power, or $c^2 + s^2 = 1$.

Equation set (7) performs a Jacobi rotation on 2×2 Hermitian matrix $D_{pq}$ to obtain matrix $V_{pq}$ of eigenvectors of $D_{pq}$. The computations in equation set (7) are designed to avoid trigonometric functions such as arc-tangent, cosine, and sine.

A T×T transformation matrix $T_i$ may be formed with matrix $V_{pq}$. $T_i$ is an identity matrix with the four elements at locations (p,p), (p,q), (q,p) and (q,q) replaced with the (1,1), (1,2), (2,1) and (2,2) elements, respectively, of $V_{pq}$. $T_i$ has the following form:

$$\underline{T}_i = \begin{bmatrix} 1 & & & & & & \\ & \ddots & & & & & \\ & & v_{pp} & \cdots & v_{pq} & & \\ & & \vdots & 1 & \vdots & & \\ & & v_{qp} & \cdots & v_{qq} & & \\ & & & & & \ddots & \\ & & & & & & 1 \end{bmatrix}. \quad \text{Eq (8)}$$

All of the other off-diagonal elements of $T_i$ not shown in equation (8) are zeros. Equations (7j) and (7k) indicate that $T_i$ is a complex matrix containing complex values for $v_{qp}$ and $v_{qq}$.

Matrix $D_i$ may be updated as follows:

$$D_{i+1} = \underline{T}_i^H D_i \underline{T}_i. \quad \text{Eq (9)}$$

Equation (9) performs Jacobi rotation with $T_i$ to zero out two off-diagonal elements $d_{pq}$ and $d_{qp}$ at locations (p,q) and (q,p) in $D_i$. The computation may alter the values of other off-diagonal elements in $D_i$.

Matrix $V_i$ may also be updated as follows:

$$V_{i+1} = V_i \underline{T}_i. \quad \text{Eq (10)}$$

$V_i$ is a cumulative transformation matrix that contains all of the transformation matrices $T_i$ used on $D_i$.

Transformation matrix $T_i$ may also be expressed as a product of (i) a diagonal matrix with T−1 ones elements and one complex-valued element and (ii) a real-valued matrix with T−2 ones along the diagonal, two real-valued diagonal elements, two real-valued off-diagonal elements, and zeros elsewhere. As an example, for p=1 and q=2, $T_i$ may be expressed as:

$$\underline{T}_i = \begin{bmatrix} c & -s & 0 & \cdots & 0 \\ g_1 s & g_1 c & 0 & \cdots & 0 \\ 0 & 0 & 1 & \cdots & \vdots \\ \vdots & \vdots & \vdots & \ddots & 0 \\ 0 & 0 & \cdots & 0 & 1 \end{bmatrix} = \begin{bmatrix} 1 & 0 & 0 & \cdots & 0 \\ 0 & g_1 & 0 & \cdots & 0 \\ 0 & 0 & 1 & \cdots & \vdots \\ \vdots & \vdots & \vdots & \ddots & 0 \\ 0 & 0 & \cdots & 0 & 1 \end{bmatrix} \quad \text{Eq (11)}$$

$$\begin{bmatrix} c & -s & 0 & \cdots & 0 \\ s & c & 0 & \cdots & 0 \\ 0 & 0 & 1 & \cdots & \vdots \\ \vdots & \vdots & \vdots & \ddots & 0 \\ 0 & 0 & \cdots & 0 & 1 \end{bmatrix},$$

where $g_1$ is a complex value and c and s are real values given in equation set (7).

Each iteration of the Jacobi rotation zeros out two off-diagonal elements of $D_i$. Multiple iterations of the Jacobi rotation may be performed for different values of indices p and q to zero out all of the off-diagonal elements of $D_i$. Indices p and q may be selected in various manners.

In one design, for each iteration, the largest off-diagonal element of $D_i$ may be identified and denoted as $d_{pq}$. The iteration may then be performed with $D_{pq}$ containing this largest off-diagonal element $d_{pq}$ and three other elements at locations (p,p), (q,p) and (q,q) in $D_i$. The iterative process may be performed for any number of iterations until a termination condition is encountered. The termination condition may be completion of a predetermined number of iterations, satisfaction of an error criterion, etc. For example, the total error or the power in all off-diagonal elements of $D_i$ may be computed and compared against an error threshold, and the iterative process may be terminated if the total error is below the error threshold.

In another design, indices p and q may be selected in a predetermined manner, e.g., by sweeping through all possible values of these indices. A single sweep across all possible values for indices p and q may be performed as follows. Index p may be stepped from 1 through T−1 in increments of one. For each value of p, index q may be stepped from p+1 through T in increments of one. An iteration of the Jacobi rotation to update $D_i$ and $V_i$ may be performed for each combination of values for p and q, as described above. For a given combination of values for p and q, the Jacobi rotation to update $D_i$ and $V_i$ may be skipped if the magnitude of the off-diagonal elements at locations (p,q) and (q,p) in $D_i$ is below a predetermined threshold.

A sweep consists of T·(T−1)/2 iterations of the Jacobi rotation to update $D_i$ and $V_i$ for all possible values of p and q. Each iteration of the Jacobi rotation zeros out two off-diagonal elements of $D_i$ but may alter other elements that might have been zeroed out earlier. The effect of sweeping through indices p and q is to reduce the magnitude of all off-diagonal elements of $D_i$, so that $D_i$ approaches diagonal matrix $\Lambda$. $V_i$ contains an accumulation of all transformation matrices that collectively give $D_i$. Thus, $V_i$ approaches V as $D_i$ approaches $\Lambda$. Any number of sweeps may be performed to obtain more and more accurate approximations of V and $\Lambda$.

Regardless of how indices p and q may be selected, upon termination of the iterative process, the final $V_i$ is a good approximation of V and is denoted as $\hat{V}$, and the final $D_i$ is a good approximation of $\Lambda$ and is denoted as $\hat{\Lambda}$. The columns of $\hat{V}$ may be used as eigenvectors of R, and the diagonal elements of $\hat{\Lambda}$ may be used as eigenvalues of R.

In another design, the iterative process to drive $\hat{V}$ may be performed based on singular value decomposition of H. For this design, T×T matrix $V_i$ is an approximation of V and may be initialized as $V_0$=I. An R×T matrix $W_i$ may be initialized as $W_0$=H.

A single iteration of the Jacobi rotation to update matrices $V_i$ and $W_i$ may be performed as follows. First, a 2×2 Hermitian matrix $M_{pq}$ may be formed based on the current $W_i$. $M_{pq}$ is a 2×2 submatrix of $W_i^H W_i$ and contains four elements at locations (p,p), (p,q), (q,p) and (q,q) in $W_i^H W_i$. $M_{pq}$ may be decomposed, e.g., as shown in equation set (7), to obtain 2×2 matrix $V_{pq}$. Transformation matrix $\underline{T}_i$ may be formed based on $V_{pq}$ as shown in equation (8). Matrix $V_i$ may then be updated with $\underline{T}_i$ as shown in equation (10). Matrix $W_i$ may also be updated based on $\underline{T}_i$, as follows:

$$W_{i+1} = W_i \underline{T}_i. \quad \text{Eq (12)}$$

The iterative process may be performed until a termination condition is encountered. For each iteration, indices p and q may be selected based on the largest element in $W_i$ or in a predetermined order.

For both eigenvalue decomposition and singular value decomposition, the receiver may send back all T·T complex-valued elements in $\hat{V}$ to the transmitter. If each complex-valued element is quantized with b bits for the real part and b bits for the imaginary part, then the receiver may send the entire $\hat{V}$ with 2b·T·T bits.

In an aspect, the receiver may send back parameters defining $\hat{V}$ instead of the elements of $\hat{V}$. As shown in equation (10), inherent in the iterative process to derive $\hat{V}$ is a representation of $\hat{V}$ as a product of transformation matrices. Each transformation matrix $\underline{T}_i$ may be formed based on a simple 2×2 unitary matrix $\overline{V}_{pq}$. Each 2×2 unitary matrix includes one complex value $g_1$ and two real values c and s. Each transformation matrix may be defined by one complex value $g_1$, two real values c and s, and the values of indices p and q if these indices are not selected in a predetermined manner. The parameters defining $\underline{T}_i$ may be sent in fewer bits than the complex-valued elements of $\hat{V}$.

In one design, the values of the elements of each transformation matrix $\underline{T}_i$ may be quantized and sent back. As an example, for each $\underline{T}_i$, the real and imaginary parts of $g_1$ may each be sent with b bits, c may be sent with b bits, and s may be sent with b bits, or a total of 4b bits. In general, $g_1$ may be sent with the same or different resolution as c and s. If the values of indices p and q are not known a priori by the transmitter, then $l = \lceil \log_2 T \cdot (T-1)/2 \rceil$ bits may be used to convey the p and q values. For example, if R is a 4×4 matrix, then there are six possible combinations of p and q values, which may be conveyed with l=3 bits.

In another design, the angles of the elements of each transformation matrix $\underline{T}_i$ may be quantized, and two real-valued angle parameters may be sent back. As shown in equation set (7), c and s may be calculated as functions of only τ even though intermediate values x and t are used to simplify notation. Since |τ| ranges from 0 to ∞, c ranges from 0.707 to 1.0, and s ranges from 0.707 to 0.0. Furthermore, since $s = \sqrt{1-c^2}$, c and s may be specified by an angle θ between 0 and 45 degrees, or 0 to π/4. Thus, c may be given as c=cos θ, and s may be given as s=sin θ, for $0 \leq \theta \leq \pi/4$. Likewise, $g_1$ may be specified by the angle of $d_{pq}$, or $\phi = \angle d_{pq}$, which is an angle between 0 and 360 degrees, or 0 to 2π.

In one design, each transformation matrix $\underline{T}_i$ may be given by (i) the sign of $(d_{qq} - d_{pp})$, which determines the form of $V_{pq}$ as shown in equations (7j) and (7k), (ii) angle φ for complex value $g_1$, and (iii) angle θ for real values c and s. One bit may be used to specify the sign of $(d_{qq} - d_{pp})$. The number of bits to use for quantization of angles $\phi$ and $\theta$ may be selected based on how much quantization error is acceptable for the desired system performance.

In one design, angle $\phi$ for $g_1$ and angle $\theta$ for c and s are given with uniform quantization. In this design, b bits may be used to specify angle $\phi$ for $g_1$ over a range of 0 to $2\pi$, and b−3 bits may be used to specify angle $\theta$ for c and s over a range of 0 to $\pi/4$. The number of bits to send for each $T_i$ may then be given as b+(b−3)+1=2b−2. For example, b=5 bits may be used for quantization of angles $\phi$ and $\theta$ to 32 uniformly spaced angles from 0 to $2\pi$. If 10 iterations are performed to obtain $\hat{V}$, then the number of bits to send for 10 transformation matrices $T_i$ for the 10 iterations may be given as $10 \cdot [(2 \cdot 5 − 2) + 3] = 110$ bits. In comparison, if $\hat{V}$ is a 4×4 matrix and the real and imaginary parts of the complex-valued elements of $\hat{V}$ are each quantized to 5 bits, then the number of bits used to send 16 complex-valued elements of $\hat{V}$ may be given as $16 \cdot 2 \cdot 5 = 160$ bits.

In another design, angle $\phi$ for $g_1$ and angle $\theta$ for c and s are given with non-uniform quantization. Angles $\phi$ and $\theta$ may be derived based on Coordinate Rotational Digital Computer (CORDIC) computation, which implements an iterative algorithm that allows for fast hardware calculation of trigonometric functions such as sine, cosine, magnitude, and phase using simple shift, add and subtract operations. A complex number $R = R_I \pm j R_Q$ may be rotated by up to 90 degrees by multiplying R with a complex number $C_m$ having the form $C_m = 1 \pm j B_m$, where $B_m = 2^{-m}$ and m is an index defined as m=0, 1, 2, . . . .

R may be rotated counter-clockwise if $C_m = 1 + j B_m$, and the rotated result may be expressed as:

$$Y_I = R_I - B_m \cdot R_Q = R_I - 2^{-m} \cdot R_Q, \text{ and}$$

$$Y_Q = R_Q + B_m \cdot R_I = R_Q + 2^{-m} \cdot R_I. \quad \text{Eq (13)}$$

R may be rotated clockwise if $C_m = 1 - j B_m$, and the rotated result may be expressed as:

$$Y_I = R_I + B_m \cdot R_Q = R_I + 2^{-m} \cdot R_Q, \text{ and}$$

$$Y_Q = R_Q - B_m \cdot R_I = R_Q - 2^{-m} \cdot R_I. \quad \text{Eq (14)}$$

The counter-clockwise rotation of R in equation set (13) and the clockwise rotation of R in equation set (14) via multiplication with $C_m$ may be achieved by (i) shifting both $R_I$ and $R_Q$ by m bit positions, (ii) adding/subtracting the shifted $R_Q$ to/from $R_I$ to obtain $Y_I$, and (iii) adding/subtracting the shifted $R_I$ to/from $R_Q$ to obtain $Y_Q$. No multiplies are needed to perform the rotation.

Table 1 shows the value of $B_m$, the complex number $C_m$, the phase of $C_m$, and the magnitude of $C_m$ for each value of m from 0 through 5. As shown in Table 1, for each value of m, the phase of $C_m$ is slightly more than half the phase of $C_{m-1}$.

TABLE 1

| m | $B_m = 2^{-m}$ | $C_m = 1 + j B_m$ | Phase of $C_m$ | Magnitude of $C_m$ |
|---|---|---|---|---|
| 0 | 1.0 | 1 + j1.0 | 45.00000 | 1.41421356 |
| 1 | 0.5 | 1 + j0.5 | 26.56505 | 1.11803399 |
| 2 | 0.25 | 1 + j0.25 | 14.03624 | 1.03077641 |
| 3 | 0.125 | 1 + j0.125 | 7.12502 | 1.00778222 |
| 4 | 0.0625 | 1 + j0.0625 | 3.57633 | 1.00195122 |
| 5 | 0.03125 | 1 + j0.03125 | 1.78991 | 1.00048816 |

The magnitude and phase of R may be determined by iteratively rotating R counter-clockwise and/or clockwise with successively smaller phases until the phase of the rotated R approaches zero and the rotated R lies mostly on the x-axis. A phase variable $\phi_{total}$ may be initialized to zero, and a variable $R_m = R_{I,m} + j R_{Q,m}$ representing the rotated R may be initialized as $R_0 = R$. For each iteration starting with m=0, $R_m$ has a positive phase if $R_{Q,m}$ is positive or a negative phase if $R_{Q,m}$ is negative. If the phase of $R_m$ is negative, then $R_m$ is rotated counter-clockwise by $\phi_m$ by multiplying $R_m$ with $C_m = 1 + j B_m$, as shown in equation set (13). Conversely, if the phase of $R_m$ is positive, then $R_m$ is rotated clockwise by $\phi_m$ by multiplying $R_m$ with $C_m = 1 - j B_m$, as shown in equation set (14). $\phi_{total}$ is updated by $+\phi_m$ if $R_m$ is rotated counter-clockwise and by $-\phi_m$ if $R_m$ is rotated clockwise. $\phi_{total}$ represents the cumulative phase that has been added to or subtracted from the phase of R to zero out the phase of $R_m$.

The final result becomes more accurate as more iterations are performed. After all of the iterations are completed, the phase of $R_m$ should be close to zero, the imaginary part of $R_m$ should be approximately zero, and the real part of $R_m$ is equal to the magnitude of R scaled by a CORDIC gain. The CORDIC gain asymptotically approaches 1.646743507 for large values of m and may be accounted for by other circuit blocks. The final value of $\phi_{total}$ is an approximation of the phase of R. $\phi_{total}$ may be represented by a sequence of sign bits, $z_0 z_1 z_2 \ldots$, where $z_m = 1$ if $\phi_m$ was subtracted from $\phi_{total}$ and $z_m = -1$ if $\phi_m$ was added to $\phi_{total}$.

Angle $\phi$ for $g_1$ may be given by a bit sequence $z_0 z_1 z_2 \ldots$ obtained from the CORDIC computation of $d_{pq}$. Angle $\theta$ for c and s may be given by another bit sequence $z_0 z_1 z_2 \ldots$ obtained from the CORDIC computation of c+js. Alternatively, a $\tau$ look-up table may be used to produce angle $\theta$ for c and s and may store the CORDIC shifts for angle $\theta$ and bypass c and s. At the transmitter, a CORDIC processor may reverse the CORDIC shifts to obtain c and s.

The techniques described herein may be used for single-carrier systems, systems that utilize OFDM, systems that utilize SC-FDM, etc. For a system that utilizes OFDM or SC-FDM, multiple channel response matrices H(k) may be obtained for multiple subcarriers. The iterative process may be performed for each channel response matrix H(k) to obtain matrices $\hat{V}(k)$ and $\hat{\Lambda}(k)$, which are approximations of matrix V(k) of eigenvectors and matrix $\Lambda(k)$ of eigenvalues for that H(k). A high degree of correlation may exist between the channel response matrices for nearby subcarriers. This correlation may be exploited by the iterative process to reduce the computation to derive $\hat{V}(k)$ and $\hat{\Lambda}(k)$ for all subcarriers of interest.

Figure 2:
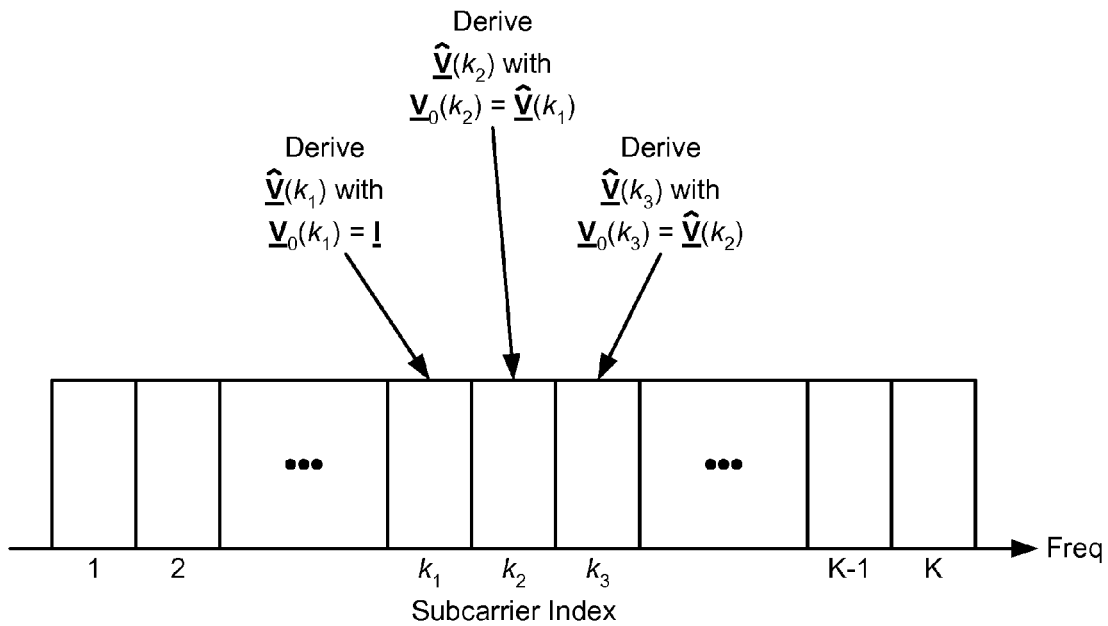
FIG. 2 illustrates eigenvalue decomposition for multiple subcarriers.

FIG. 2 illustrates eigenvalue decomposition for multiple subcarriers. The iterative process may be performed for one subcarrier at a time. For the first subcarrier $k_1$, matrix $V_i(k_1)$ may be initialized to the identity matrix, or $V_0(k_1) = I$, and matrix $D_i(k_1)$ may be initialized to $\underline{R}(k_1)$, or $D_0(k_1) = \underline{R}(k_1) = H^H(k_1) H(k_1)$. The iterative process may then operate on the initial solutions $V_0(k_1)$ and $D_0(k_1)$ for subcarrier $k_1$ until a termination condition is encountered. The iterative process may provide the final $V_i(k_1)$ and $D_i(k_1)$ as $\hat{V}(k_1)$ and $\hat{\Lambda}(k_1)$, respectively, for subcarrier $k_1$.

For the next subcarrier $k_2$, which may be adjacent to or nearby subcarrier $k_1$, matrix $V_i(k_2)$ may be initialized to the final result for subcarrier $k_1$, or $V_0(k_2) = \hat{V}(k_1)$, and matrix $D_i(k_2)$ may be initialized as $D_0(k_2) = V_0^H(k_2) \underline{R}(k_2) V_0(k_2)$. The iterative process may then operate on the initial solutions $V_0(k_2)$ and $D_0(k_2)$ for subcarrier $k_2$ until a termination condition is encountered. The iterative process may provide the final $V_i(k_2)$ and $D_i(k_2)$ as $\hat{V}(k_2)$ and $\hat{\Lambda}(k_2)$, respectively, for subcarrier $k_2$.

For each subsequent subcarrier k, the final results obtained for the nearest subcarrier may be used as the initial solutions $V_0(k)$ and $D_0(k)$ for subcarrier k. The iterative process may then operate on the initial solutions to obtain the final results for subcarrier k.

The receiver may perform decomposition for a set of subcarriers. This set may include consecutive subcarriers, or subcarriers spaced apart by some uniform or non-uniform spacing, or specific subcarriers of interest. The receiver may send feedback information (e.g., parameters used to derive $\hat{V}(k)$) for this set of subcarriers.

The concept described above may also be used across time. For each time interval t, the final solutions obtained for a prior time interval may be used as the initial solutions for the current time interval t. The iterative process may then operate on the initial solutions for time interval t until a termination condition is encountered. The concept may also be extended across both frequency and time.

In general, the receiver may derive a transmit steering matrix in any manner. A transmit steering matrix may be any matrix usable for spatial processing by a transmitter. A transmit steering matrix may be a matrix of eigenvectors for a MIMO channel, some other unitary matrix that may provide good performance, etc. A transmit steering matrix may also be referred to as a steering matrix, a preceding matrix, eigenvectors, etc. The receiver may derive a transmit steering matrix based on any type of transformation, e.g., eigenvalue decomposition, singular value decomposition, iterative Jacobi rotation, etc. The parameters defining the transmit steering matrix, which may be dependent on the type of transformation used to derive the transmit steering matrix, may be sent to the transmitter. The parameters may be represented in various forms, e.g., with real and/or complex values, angles, format indicator, row and column indices, etc.

Figure 3:
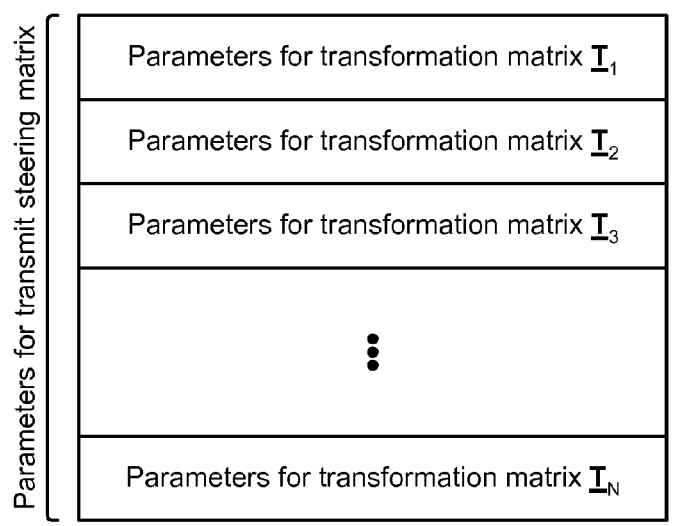
FIG. 3 illustrates feedback of a transmit steering matrix.

FIG. 3 illustrates example feedback sent by the receiver to the transmitter for a transmit steering matrix, e.g., matrix $\hat{V}$. The feedback information may include parameters for N transformation matrices used to derive the transmit steering matrix, instead of elements of the transmit steering matrix. The parameters for each transformation matrix may comprise (i) values of elements of the transformation matrix, e.g., $g_1$, c and s, (ii) angles of elements of the transformation matrix, e.g., $\phi$ and $\theta$, (iii) row and column indices of elements of the transformation matrix, e.g., p and q, (iv) the form of the transformation matrix, e.g., a sign bit to indicate whether to use the form shown in equation (7j) or (7k), and/or (v) some other information. The row and column indices may be omitted if the elements are selected in a predetermined order that is known a priori by the transmitter.

In general, various parameters may be conveyed to allow the transmitter to derive the transmit steering matrix. The parameters to convey may be dependent on various factors such as the type of transformation being performed (e.g., iterative Jacobi rotation), the manner in which the transformation is performed, the manner in which the elements of each transformation matrix are represented, etc. The parameters to send as feedback may be encoded or compressed to further reduce the number of bits to send for the parameters.

Figure 4:
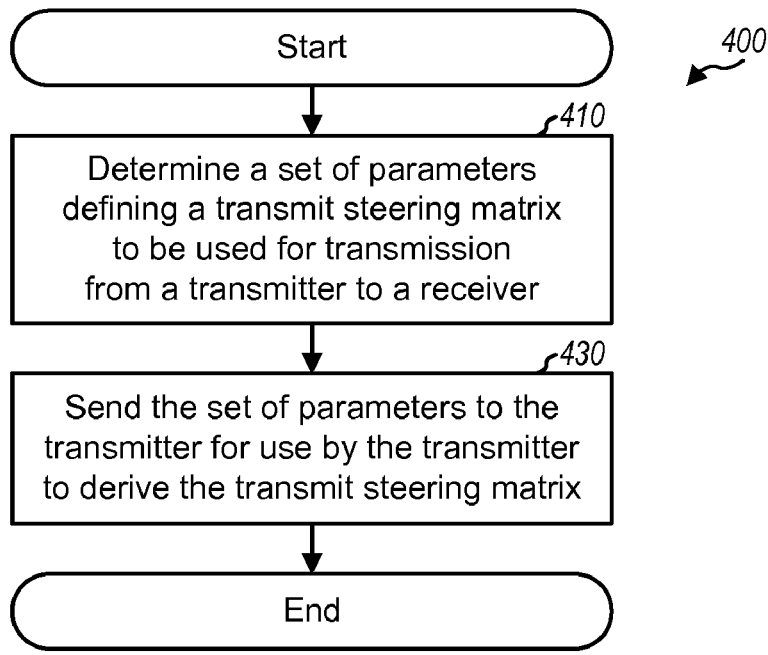
FIG. 4 shows a process performed by a receiver.

FIG. 4 shows a design of a process 400 performed by a receiver. A set of parameters defining a transmit steering matrix to be used for transmission from a transmitter to the receiver may be determined (block 410). For block 410, the transmit steering matrix may be derived based on a plurality of transformation matrices, which may be formed in any manner. The set of parameters may then be determined based on the plurality of transformation matrices. The set of parameters may be sent to the transmitter for use by the transmitter to derive the transmit steering matrix (block 412).

Figure 5:
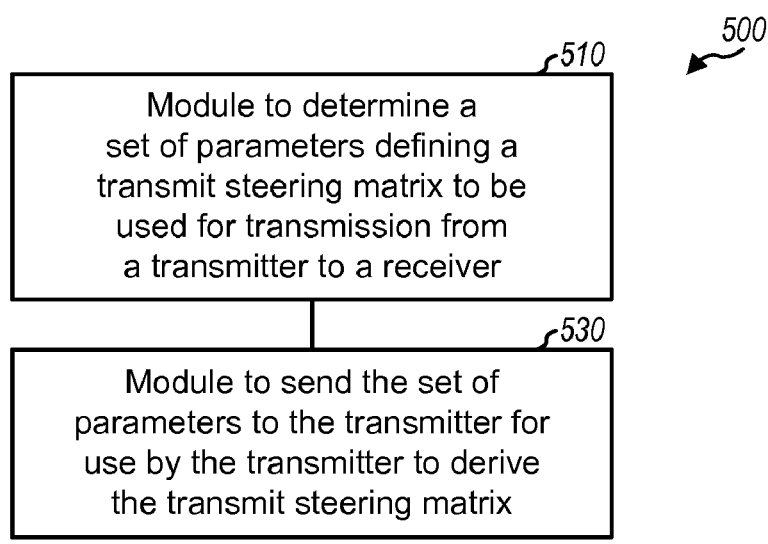
FIG. 5 shows an apparatus for the receiver.

FIG. 5 shows a design of an apparatus 500 for a receiver. Apparatus 500 includes means for determining a set of parameters defining a transmit steering matrix to be used for transmission from a transmitter to the receiver (module 510) and means for sending the set of parameters to the transmitter for use by the transmitter to derive the transmit steering matrix (module 512). Modules 510 and 512 may comprise processors, electronics devices, hardware devices, electronics components, logical circuits, memories, etc., or any combination thereof.

Figure 6:
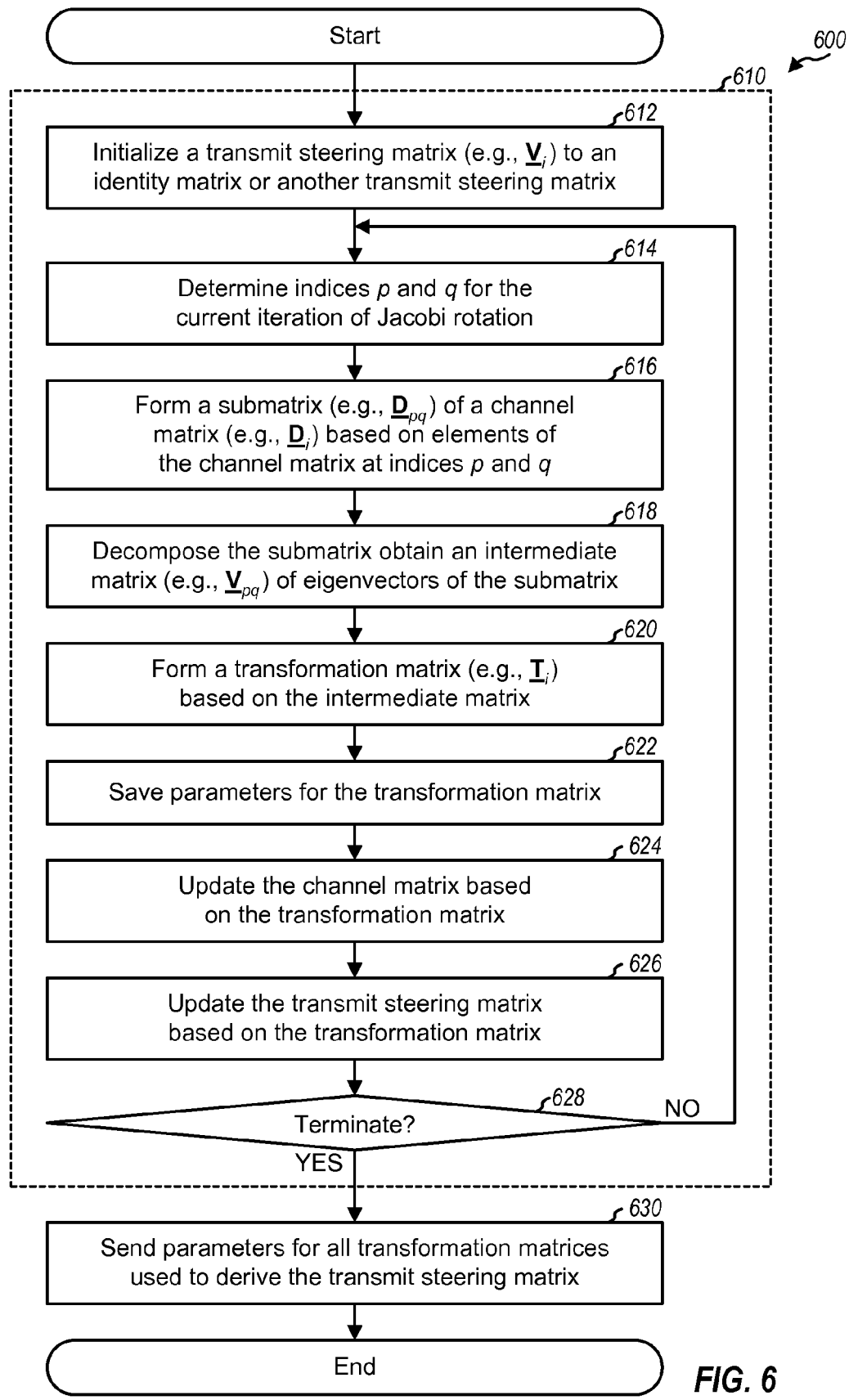
FIG. 6 shows another process performed by the receiver.

FIG. 6 shows a design of a process 600 performed by a receiver. A plurality of iterations of Jacobi rotation may be performed on a channel matrix (e.g., $D_i$) with a plurality of transformation matrices (e.g., $T_i$) to zero out off-diagonal elements of the channel matrix (block 610). The channel matrix may be a correlation matrix R, a channel response matrix H, or some other matrix derived based on a channel response estimate. The transmit steering matrix may be initialized to an identity matrix, a transmit steering matrix obtained for another subcarrier, a transmit steering matrix obtained for another time interval, etc. (block 612)

For each iteration of the Jacobi rotation, indices p and q may be determined, e.g., by sweeping through the elements of the channel matrix in a predetermined order, or by identifying the largest off-diagonal element of the channel matrix (block 614). A submatrix (e.g., $D_{pq}$) of the channel matrix may be formed based on elements of the channel matrix at indices p and q (block 616). The submatrix may be decomposed to obtain an intermediate matrix (e.g., $V_{pq}$) of eigenvectors of the submatrix, e.g., as shown in equation set (7) (block 618). A transformation matrix (e.g., $T_i$) may be formed based on the intermediate matrix (block 620), and parameters of the transformation matrix may be saved (block 622). The channel matrix may be updated based on the transformation matrix, e.g., as shown in equation (9) (block 624). The transmit steering matrix may also be updated based on the transformation matrix, e.g., as shown in equation (10) (block 626).

If a termination condition is not encountered, as determined in block 628, then the process returns to block 614 for the next iteration of the Jacobi rotation. Otherwise, parameters for all transformation matrices used to derive the transmit steering matrix may be sent to the transmitter (block 630). These parameters may comprise, for each transformation matrix, at least one angle, at least one value, at least one index, an indication of the form of the transformation matrix, etc. The at least one angle may be given with uniform or non-uniform quantization, e.g., non-uniform quantization obtained from CORDIC computation.

Figure 7:
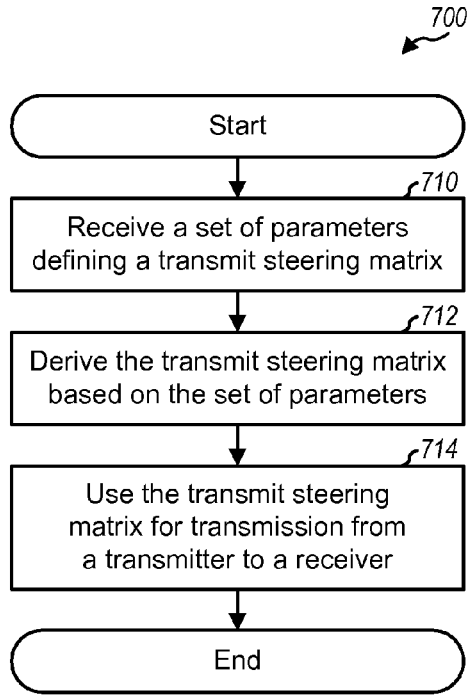
FIG. 7 shows a process performed by a transmitter.

FIG. 7 shows a design of a process 700 performed by a transmitter. A set of parameters defining a transmit steering matrix may be received from a receiver (block 710). The transmit steering matrix may be derived based on the set of parameters (block 712). For block 712, a plurality of transformation matrices may be formed based on the set of parameters. The transmit steering matrix may then be updated with each of the transformation matrices. The transmit steering matrix may be used for transmission from the transmitter to the receiver (block 714).

Figure 8:
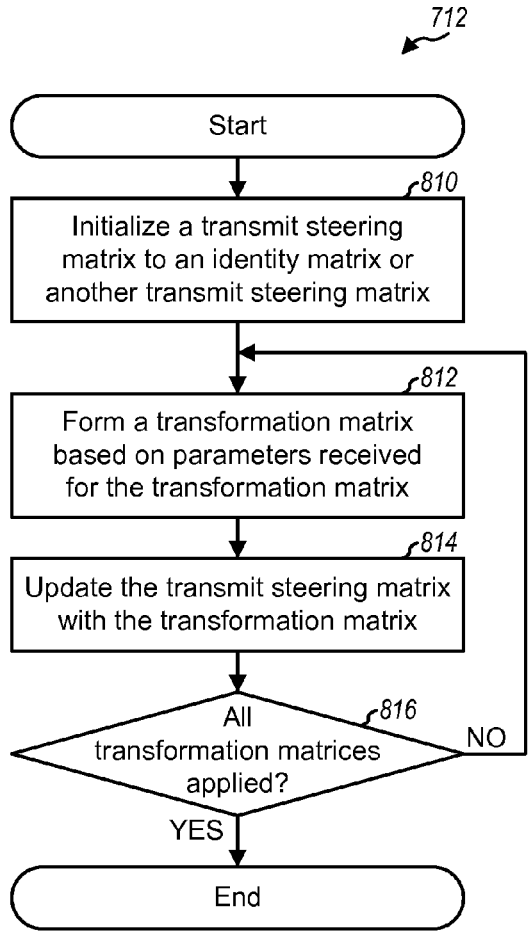
FIG. 8 shows a process to derive a transmit steering matrix by the transmitter.

FIG. 8 shows a design of a process for block 712 in FIG. 7. The transmit steering matrix may be initialized to an identity matrix, a transmit steering matrix for another subcarrier, a transmit steering matrix for another time interval, etc. (block 810). A transformation matrix may be formed based on parameters received for the transformation matrix (block 812). For example, at least one angle may be received for the transformation matrix, and CORDIC computation may be performed on the at least one angle to obtain at least one element of the transformation matrix. The transmit steering matrix may be updated with the transformation matrix (block 814). If all transformation matrices have not been applied, then the process returns to block 812 to form and apply the next transformation matrix. Otherwise, the process terminates.

Figure 9:
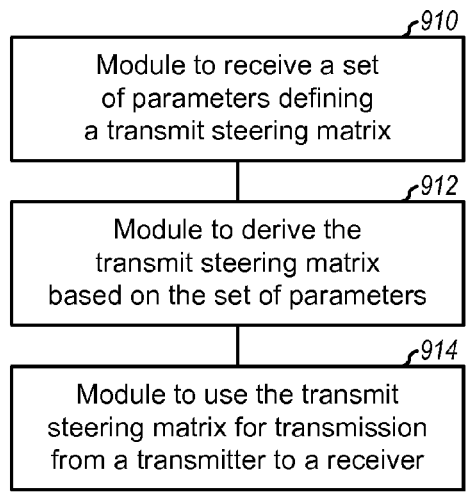
FIG. 9 shows an apparatus for the transmitter.

FIG. 9 shows a design of an apparatus 900 for a transmitter. Apparatus 900 includes means for receiving a set of parameters defining a transmit steering matrix from a receiver (module 910), means for deriving the transmit steering matrix based on the set of parameters (module 912), and means for using the transmit steering matrix for transmission from the transmitter to the receiver (module 914). Modules 910 to 914 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 132 or 182 in FIG. 1) and executed by a processor (e.g., processor 130 or 180). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
at least one processor configured to determine a set of parameters defining a set of transformation matrices for deriving a transmit steering matrix to be used for transmission from a transmitter using multiple transmit antennas to a receiver using multiple receive antennas, wherein the transmit steering matrix is representable as a product of the transformation matrices, and send the set of parameters to the transmitter for use by the transmitter to derive the transmit steering matrix;
a memory coupled to the at least one processor, and
wherein the at least one processor is configured to perform a plurality of iterations of Jacobi rotation on a channel matrix which is derived based on a channel response estimate with the plurality of transformation matrices to zero out off-diagonal elements of the channel matrix, wherein for each iteration of the Jacobi rotation the at least one processor is configured to derive a transformation matrix as an identity matrix having diagonal and off-diagonal elements replaced with elements derived from eigenvectors of the channel matrix, to update the transmit steering matrix based on the transformation matrix to zero out off-diagonal elements of the channel matrix, identify a largest off-diagonal element of the channel matrix, and to derive the transformation matrix based on row and column indices of the largest off-diagonal element.

2. The apparatus of claim 1, wherein the at least one processor is configured to derive the transmit steering matrix based on the plurality of transformation matrices, and to determine the set of parameters based on the plurality of transformation matrices.

3. The apparatus of claim 1, wherein for each iteration of the Jacobi rotation, the at least one processor is configured to form a submatrix of the channel matrix, to decompose the submatrix to obtain an intermediate matrix of eigenvectors of the submatrix, and to form the transformation matrix based on the intermediate matrix.

4. The apparatus of claim 1, wherein the at least one processor is configured to select elements of the channel matrix in a predetermined order for the plurality of iterations of the Jacobi rotation, and to derive the transformation matrix for each iteration of the Jacobi rotation based on elements of the channel matrix selected for the iteration.

5. The apparatus of claim 1, wherein the at least one processor is configured to initialize the transmit steering matrix to an identity matrix, a transmit steering matrix for another subcarrier, or a transmit steering matrix for another time interval prior to the plurality of iterations of the Jacobi rotation.

6. The apparatus of claim 1, wherein the at least one processor is configured to derive the channel matrix based on a channel response estimate.

7. The apparatus of claim 1, wherein the at least one processor is configured to to derive a correlation matrix for a channel response matrix and to use the correlation matrix as the channel matrix.

8. The apparatus of claim 2, wherein the set of parameters comprises at least one angle of a complex value for at least one element of each of the transformation matrices.

9. The apparatus of claim 8, wherein the at least one processor is configured to obtain the at least one angle for each transformation matrix with uniform quantization.

10. The apparatus of claim 8, wherein the at least one processor is configured to obtain the at least one angle for each transformation matrix with non-uniform quantization from CORDIC computation.

11. The apparatus of claim 2, wherein the set of parameters comprises at least one value for at least one element of each transformation matrix, at least one index for the at least one element of each transmit, an indication of a form of each transformation matrix, or a combination thereof.

12. A method comprising:
determining a set of parameters defining a set of transformation matrices for deriving a transmit steering matrix to be used for transmission from a transmitter using multiple transmit antennas to a receiver using multiple receive antennas, wherein the transmit steering matrix is representable as a product of the transformation matrices; and sending the set of parameters to the transmitter for use by the transmitter to derive the transmit steering matrix, wherein the determining the set of parameters comprises deriving the transmit steering matrix based on the plurality of transformation matrices, and determining the set of parameters based on the plurality of transformation matrices, wherein the deriving the transmit steering matrix comprises performing a plurality of iterations of Jacobi rotation on a channel matrix which is derived based on a channel response estimate with the plurality of transformation matrices, and for each iteration of the Jacobi rotation, deriving a transformation matrix as an identity matrix having diagonal and off-diagonal elements replaced with elements derived from eigenvectors of the channel matrix, updating the channel matrix based on the transformation matrix, and updating the transmit steering matrix based on the transformation matrix to zero out off-diagonal elements of the channel matrix, identifying a largest off-diagonal element of the channel matrix, and to derive the transformation matrix based on row and column indices of the largest off-diagonal element.

13. The method of claim 12, wherein the determining the set of parameters based on the plurality of transformation matrices comprises forming the set of parameters with at least one angle of a complex value for at least one element of each transformation matrix.

14. An apparatus comprising:

means for determining a set of parameters defining a set of transformation matrices for deriving a transmit steering matrix to be used for transmission from a transmitter using multiple transmit antennas to a receiver using multiple receive antennas, wherein the transmit steering matrix is representable as a product of the transformation matrices; and means for sending the set of parameters to the transmitter for use by the transmitter to derive the transmit steering matrix, wherein the means for determining the set of parameters comprises means for deriving the transmit steering matrix based on the plurality of transformation matrices, and means for determining the set of parameters based on the plurality of transformation matrices, wherein the means for deriving the transmit steering matrix comprises means for performing a plurality of iterations of Jacobi rotation on a channel matrix which is derived based on a channel response estimate with the plurality of transformation matrices, and means for, for each iteration of the Jacobi rotation, deriving a transformation matrix as an identity matrix having diagonal and off-diagonal elements replaced with elements derived from eigenvectors of the channel matrix, updating the channel matrix based on the transformation matrix, and updating the transmit steering matrix based on the transformation matrix to zero out off-diagonal elements of the channel matrix, identifying a largest off-diagonal element of the channel matrix, and to derive the transformation matrix based on row and column indices of the largest off-diagonal element.

15. The apparatus of claim 14, wherein the means for determining the set of parameters based on the plurality of transformation matrices comprises means for forming the set of parameters with at least one angle of a complex value for at least one element of each transformation matrix.

16. An apparatus comprising:

at least one processor configured to receive a set of parameters defining a set of transformation matrices for deriving a transmit steering matrix, wherein the transmit steering matrix is representable as a product of the transformation matrices, to form the set of transformation matrices based on the set of parameters, to derive the transmit steering matrix based on the set of transformation matrices, and to use the transmit steering matrix for transmission from a transmitter using multiple transmit antennas to a receiver using multiple receive antennas;

a memory coupled to the at least one processor, and wherein the at least one processor is configured to perform a plurality of iterations of Jacobi rotation on a channel matrix which is derived based on a channel response estimate with the plurality of transformation matrices to zero out off-diagonal elements of the channel matrix, wherein for each iteration of the Jacobi rotation the at least one processor is configured to derive a transformation matrix as an identity matrix having diagonal and off-diagonal elements replaced with elements derived from eigenvectors of the channel matrix, to update the transmit steering matrix based on the transformation matrix to zero out off-diagonal elements of the channel matrix, identify a largest off-diagonal element of the channel matrix, and to derive the transformation matrix based on row and column indices of the largest off-diagonal element.

17. The apparatus of claim 16, wherein the at least one processor is configured to initialize the transmit steering matrix and to update the transmit steering matrix with each of the transformation matrices.

18. The apparatus of claim 16, wherein the at least one processor is configured to obtain at least one angle of a complex value for at least one element of each transformation matrix from the set of parameters, and to form each transformation matrix based on the at least one angle for the transformation matrix.

19. The apparatus of claim 18, wherein the at least one processor is configured to derive the at least one element of each transformation matrix by performing CORDIC computation based on the at least one angle for the transformation matrix.

20. The apparatus of claim 17, wherein the at least one processor is configured to initialize the transmit steering matrix to an identity matrix, a transmit steering matrix for another subcarrier, or a transmit steering matrix for another time interval.

* * * * *